(12) United States Patent
Fujisawa

(10) Patent No.: US 11,050,728 B2
(45) Date of Patent: Jun. 29, 2021

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventor: Minoru Fujisawa, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 243 days.

(21) Appl. No.: 16/017,112

(22) Filed: Jun. 25, 2018

(65) Prior Publication Data

US 2019/0007391 A1    Jan. 3, 2019

(30) Foreign Application Priority Data

Jun. 30, 2017  (JP) .............................. JP2017-129432

(51) Int. Cl.
*H04L 29/06* (2006.01)
*H04L 9/12* (2006.01)
*H04L 9/32* (2006.01)

(52) U.S. Cl.
CPC ............ *H04L 63/0807* (2013.01); *H04L 9/12* (2013.01); *H04L 9/3213* (2013.01); *H04L 9/3271* (2013.01); *H04L 63/205* (2013.01)

(58) Field of Classification Search
CPC ....... H04L 9/3213; H04L 9/3271; H04L 9/12; H04L 63/0807; H04L 63/205; H04L 63/18
See application file for complete search history.

(56) References Cited

U.S. PATENT DOCUMENTS

| 6,581,110 B1* | 6/2003 | Harif ...................... H04L 29/06 709/248 |
| 9,477,285 B2 | 10/2016 | Fujisawa |
| 2003/0154413 A1* | 8/2003 | Shigeeda ................ G06F 21/31 726/3 |
| 2006/0156011 A1* | 7/2006 | Masui ................... H04L 9/3297 713/178 |

(Continued)

FOREIGN PATENT DOCUMENTS

| JP | 2003108527 A | 4/2003 |
| JP | 2006099574 A | 4/2006 |

(Continued)

OTHER PUBLICATIONS

Notice of Reasons for Refusal issued by the Japan Patent Office dated May 11, 2021 in corresponding JP Patent Application No. 2017-129432, with English translation.

*Primary Examiner* — Daniel B Potratz
*Assistant Examiner* — Wansik You
(74) *Attorney, Agent, or Firm* — Carter, DeLuca & Farrell LLP

(57) ABSTRACT

An information processing apparatus includes a synchronization unit performing a process of time-of-day synchronization with a time-of-day synchronization server, and an authentication unit performing authentication by a first authentication method. In a case where the authentication by the first authentication method fails and the process of time-of-day synchronization is not performed within a set period of time, the authentication unit performs the authentication by a second authentication method. Thus, it is possible to improve convenience of the information processing apparatus.

12 Claims, 6 Drawing Sheets

(56) References Cited

U.S. PATENT DOCUMENTS

| | | | |
|---|---|---|---|
| 2014/0031993 A1* | 1/2014 | Matsuoka | G05D 23/1919 700/276 |
| 2016/0011822 A1* | 1/2016 | Ikeda | G06F 3/1204 358/1.14 |
| 2016/0065553 A1* | 3/2016 | Lim | H04L 67/22 726/6 |

FOREIGN PATENT DOCUMENTS

| | | |
|---|---|---|
| JP | 2006195752 A | 7/2006 |
| JP | 2007110351 A | 4/2007 |
| JP | 2011232884 A | 11/2011 |
| JP | 2016035751 A | 3/2016 |

* cited by examiner

INFORMATION PROCESSING APPARATUS, INFORMATION PROCESSING METHOD, AND RECORDING MEDIUM

CROSS-REFERENCE TO RELATED APPLICATIONS

This application claims the benefit of Japanese Patent Application No. 2017-129432, filed Jun. 30, 2017, which is hereby incorporated by reference herein in its entirety.

BACKGROUND OF THE INVENTION

Field of the Invention

The present invention relates to an information processing apparatus, an information processing method, and a recording medium.

Description of the Related Art

For example, there is a system for transferring a file to a pre-specified destination server. In the system like this, a network protocol for file sharing such as SMB (Server Message Block) or the like is used for network transfer to the destination server. Besides, in the system like this, user authentication is performed beforehand between a file transfer side and a transfer destination, so as to permit an authenticated user to browse shared folders and to transfer files.

For the user authentication, Kerberos authentication or NTLM (Windows NT LAN Manager) authentication is used. The NTLM authentication enables one-to-one authentication between the file transfer side and the transfer destination and is therefore useful in terms of convenience. In the Kerberos authentication, a KDC (Key Distribution Center) collectively manages user authentication information, and the file transfer side performs authentication with the KDC to obtain a ticket. User information on the file transfer destination is also managed on the side of the KDC, and the file transfer side uses the ticket obtained from the KDC to access the transfer destination.

The Kerberos authentication is used in an integrated user authentication management system in medium-sized or larger office environments (Japanese Patent Application Laid-Open No. 2007-110351).

In the integrated user authentication management system such as the Kerberos authentication, authentication may be influenced by a difference between times of day respectively managed in an authentication server such as the KDC and an information processing apparatus.

On the side of the authentication server, a time of day is thoroughly managed for the operation of the integrated user authentication management system. However, since the information processing apparatuses are terminals including MFPs (multifunction peripherals), PCs (personal computers) and the like, the operation of the information processing apparatuses is entrusted to managers and/or users of respective terminals. Hence, the times of day of the information processing apparatuses are managed in a careless manner as compared with the authentication server.

If there is a certain time difference between the time of day at the information processing apparatus and the time of day of the authenticating server, the authentication fails. Even in such a case, for security and other reasons, generally the authenticating server side then makes no response to the information processing apparatus of a detailed reason for the failure of the authentication.

As a result, the failure of the authentication is determined to be due to an error in inputting either a user ID (identification) or a password, or an unknown reason, thereby degrading the convenience of the information processing apparatus.

SUMMARY OF THE INVENTION

An information processing apparatus according to the present invention includes a synchronization unit performing a process of time-of-day synchronization with a time-of-day synchronization server, and an authentication unit performing authentication by a first authentication method. In a case where the authentication by the first authentication method fails and the process of time-of-day synchronization is not performed within a set period of time, the authentication unit performs the authentication by a second authentication method.

According to the present invention, it is possible to improve convenience of the information processing apparatus.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
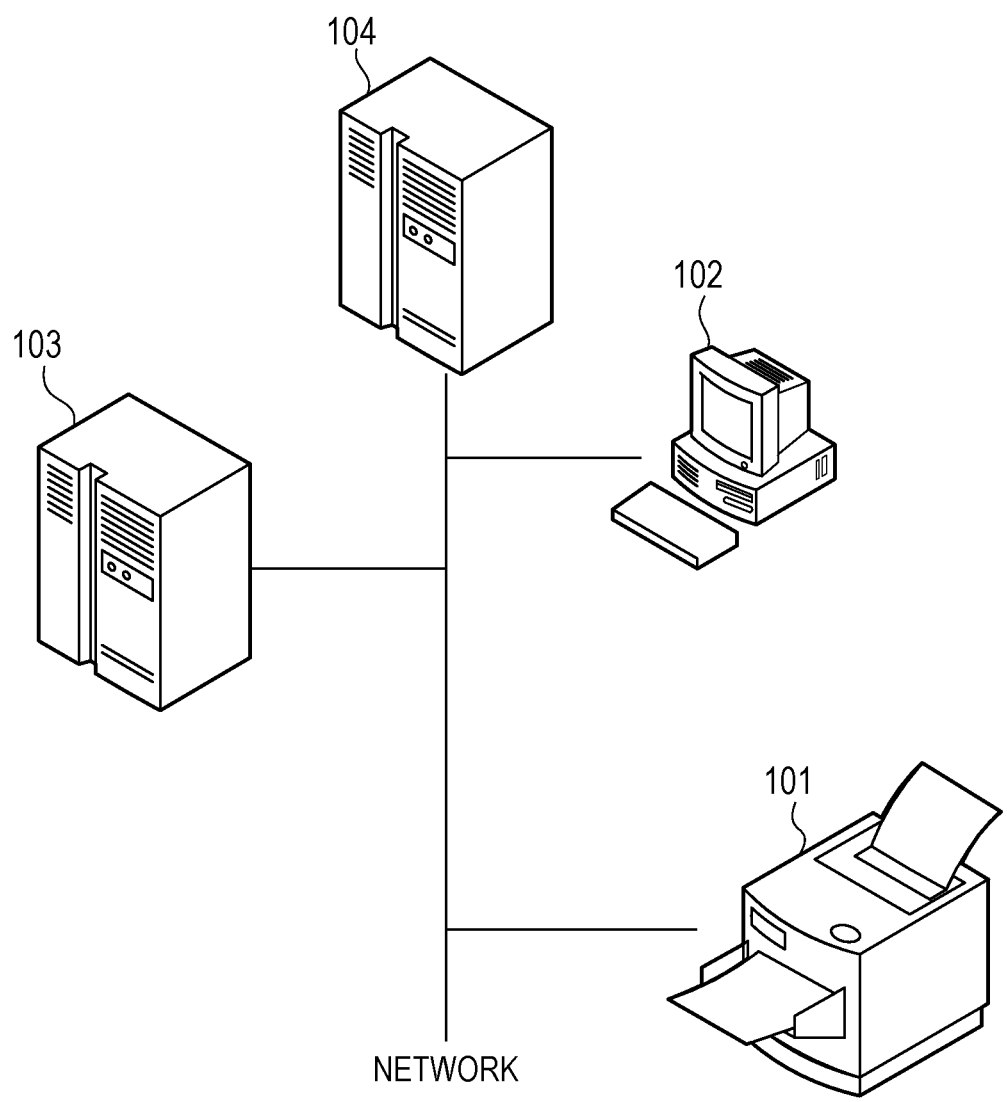
FIG. 1 is a diagram illustrating an example of a system configuration of an information processing system.

FIG. 1 is a diagram illustrating an example of a system configuration of an information processing system. In the information processing system, an MFP 101, a server 102, an integrated authentication management server 103, and a time-of-day synchronization server 104 are connected to one another over a network to be able to communicate with one another.

The MFP 101 is an example of a device on a file transfer side. The MFP 101 is also an example of an image processing apparatus.

The server 102 is a server at a file transfer destination and is a terminal with a typical file system, such as a PC. The server 102 is an example of a server at a data transmission destination. The integration authentication management server 103 is configured to manage user authentication information used for logging in to the server 102 in, for example, the Kerberos authentication. The integrated authentication management server 103 is an example of an authentication server.

The time-of-day synchronization server 104 is equipped with NTP (Network Time Protocol) to perform a time-of-day synchronization process. In the time-of-day synchronization process, the time-of-day synchronization server 104 receives a time-of-day synchronization request over the network and replies with a time of day, so as to synchronize a time of day with a device having transmitted the time-of-day synchronization request.

Figure 2:
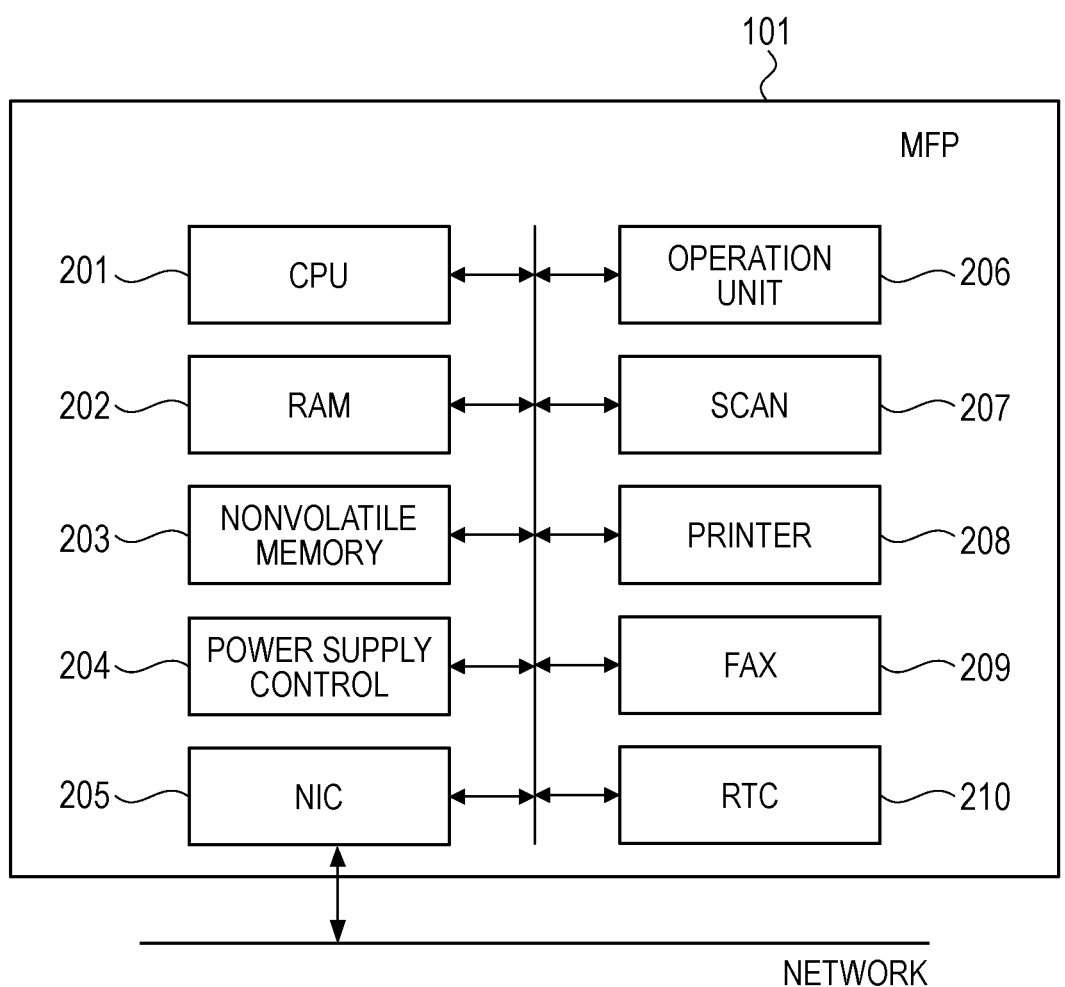
FIG. 2 is a diagram illustrating an example of a hardware configuration of an MFP.

FIG. 2 is a diagram illustrating an example of a hardware configuration of the MFP 101. The MFP 101 is connected to the network via a NIC (network interface card) 205.

A CPU 201 controls the MFP 101 as a whole. The CPU 201 executing processes based on programs stored in a non-volatile memory 203 provides the software configuration illustrated in FIG. 3 and the process of a flowchart illustrated in FIG. 4, which will be described later.

A RAM (random access memory) 202 is a random access memory and used for storing temporary data in the execution of a process by the CPU 201 based on a program.

The non-volatile memory 203 is a storage space including Flash memory and used for saving programs and various settings for the MFP 101 or spooling print data or scan data.

A power supply control 204 is a power supply device of the MFP 101. The power supply control 204 is configured to perform power energization control in turning on/off a power source or during sleep mode.

The NIC 205 is configured to connect the MFP 101 to the network and control data communication with external apparatuses on the network.

An operation unit 206 is configured to display various operation screens and transmit instructions input via an operation screen to the CPU 201.

A scan 207 is a scanner and configured to read a document or an image printed on a submitted paper sheet and convert the document or the image into image data or a file.

A printer 208 is configured to print an image based on image data on a recording medium. In printing, the printer 208 performs processing such as color conversion, filter processing, and resolution conversion, on print data.

A FAX 209 is a facsimile and configured to receive a document or an image from a transfer source over a telephone line or the like and transfer data to the printer 208 for printing, or to transmit data transferred from the scan 207 to a transfer destination.

An RTC 210 is a real time clock configured to manage a current time of day in the MFP 101.

Figure 3:
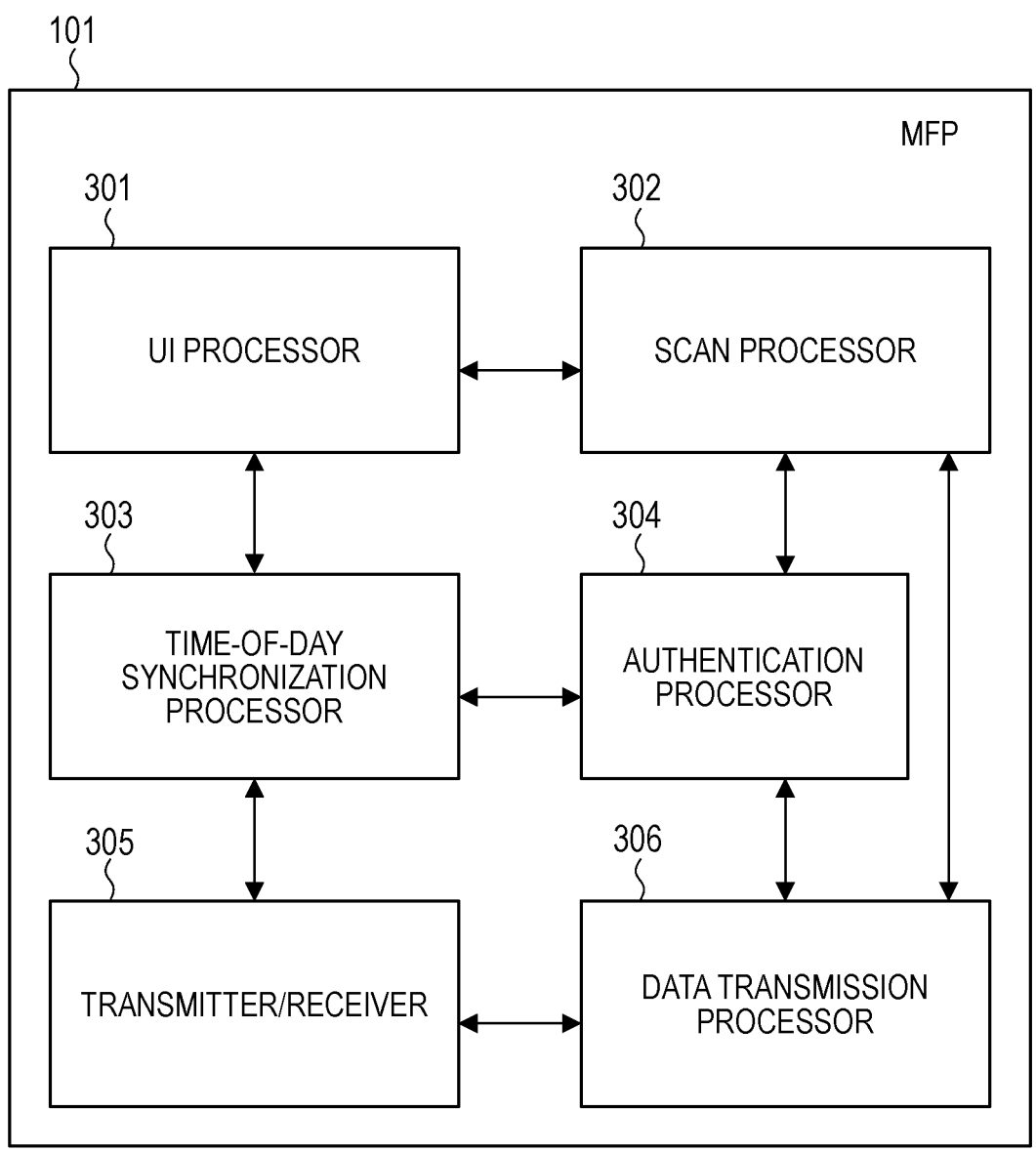
FIG. 3 is a diagram illustrating an example of a software configuration of the MFP.

FIG. 3 is a diagram illustrating an example of a software configuration of the MFP 101.

A UI (user interface) processor 301 is configured to acquire various settings for printing, scanning, or FAX via the operation unit 206 and display the settings. The UI processor is also configured to display the status of each job or a history of jobs.

A scan processor 302 is configured to manage a document or an image submitted via the scan 207 and read, in a form of a scan job or a file.

The scan processor 302 is configured to transfer a scan job or a file to a specified destination. For this purpose, the scan processor 302 is configured to manage transfer destination information, a transfer unit, a transfer timing, user authentication information for a transfer destination, and the like that are set via the operation unit 206.

A time-of-day synchronization processor 303 is configured to acquire the current time of day from the RTC 210 and to send a time-of-day synchronization request to the time-of-day synchronization server 104 using NTP. The time-of-day synchronization processor 303 is configured to receive a time of day from the time-of-day synchronization server 104 and reset the RTC 210 to the received time of day.

A time-of-day synchronization process is performed by the time-of-day synchronization processor 303 receiving a time-of-day synchronization instruction or a time-of-day setting instruction from the UI processor 301 or an authentication processor 304.

The authentication processor 304 uses user authentication information transferred from the scan processor 302 to perform a user authentication process for logging in to the server 102 as a file transmission destination.

Which authentication method is to be used in the user authentication process is determined by the authentication processor 304 from an authenticatable method list transferred from the server 102.

A transmitter/receiver 305 is configured to generate a network packet in response to various transmission instructions and reception instructions from the time-of-day synchronization processor 303 or a data transmission processor 306 to be described later. The transmitter/receiver 305 is configured to transmit a generated packet to the server 102, the integrated authentication management server 103, or the time-of-day synchronization server 104, and to receive returned response data and perform a packet analysis process.

The transmitter/receiver 305 is configured to transfer files to the server 102 using SMB or WebDAV, communicate with the integrated authentication management server 103 for the Kerberos authentication, or communicate with the time-of-day synchronization server 104 using NTP for time-of-day synchronization.

The data transmission processor 306 is configured to transmit a scan job or a file transferred from the scan processor 302 via the transmitter/receiver 305 to the server 102. The data transmission processor 306 is configured to browse a plurality of folders in a shared folder of the server 102 to allow an operator of the MFP 101 to select which folder path in the shared folder of the server 102 to transmit the data by. The data transmission processor 306 is configured to inform the UI processor 301 of information on a browsing status via the scan processor 302, allowing the operator of the MFP 101 to select a data transfer destination. The data transmission processor 306 is further configured to receive an instruction from the authentication processor 304 and request, via the transmitter/receiver 305, user authentication for logging in to the server 102 for file sharing.

An authentication method for user authentication is determined by the authentication processor 304. Depending on the determined method, the data transmission processor 306 determines whether to make an authentication request to the server 102 or to the integrated authentication management server 103, and makes the authentication request to the determined server.

Figure 4:
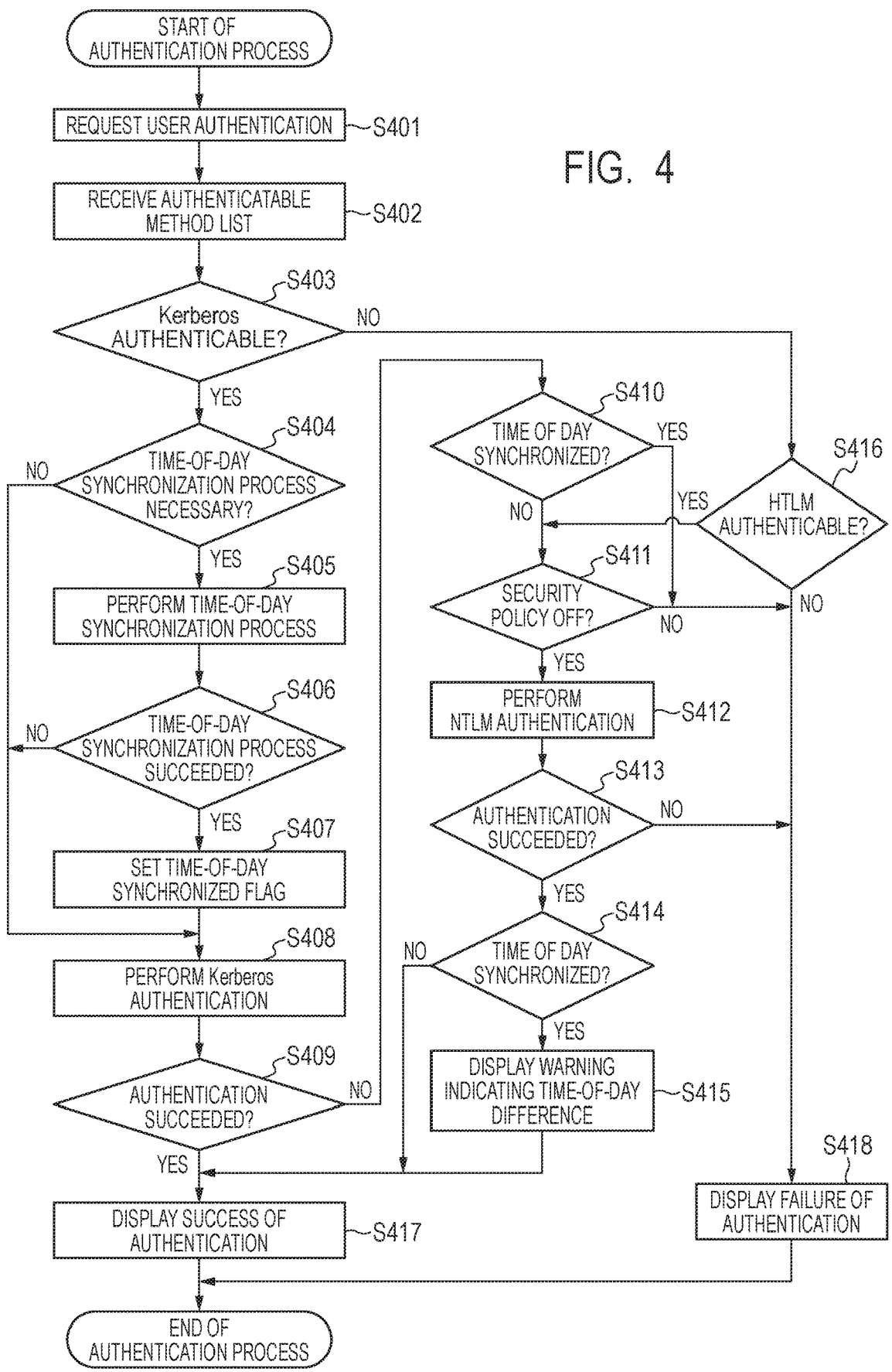
FIG. 4 is a flowchart illustrating an example of an authentication process.

FIG. 4 is a flowchart illustrating an example of an authentication process.

When an operator of the MFP 101 is to submit scan data and transfer the scan data to the server 102 specified via the operation unit 206, logging in to the server 102 beforehand is needed. An example of a user authentication performed in the login will be described.

In S401, the authentication processor 304 requests user authentication to the server 102 via the data transmission processor 306 and the transmitter/receiver 305.

In S402, as a response for S401 from the server 102, the authentication processor 304 receives an authenticatable method list supported by the server 102, via the transmitter/receiver 305 and the data transmission processor 306. The authenticatable method list contains only user authentication methods available in the server 102, such as NTLM authentication and Kerberos authentication. The authenticatable method list is an example of a list of authentication methods.

In S403, from among the authenticatable method list, the authentication processor 304 preferentially selects one of user authentication methods that can be processed by the MFP 101, the one having a higher security strength. In the present embodiment, assume that the authentication methods available in the MFP 101 are the Kerberos authentication and the NTLM authentication. Under this assumption, the authentication processor 304 determines whether the authenticatable method list contains the Kerberos authentication. When the authenticatable method list contains the Kerberos authentication (YES in S403), the authentication processor 304 advances the process to S404, and when the authenticatable method list does not contain the Kerberos authentication (NO in S403), the authentication processor 304 advances the process to S416.

In S404, the authentication processor 304 determines whether or not it is necessary to perform the time-of-day synchronization process, and determines whether performing the time-of-day synchronization process is possible. The authentication processor 304 determines whether or not it is necessary to perform the time-of-day synchronization process by checking a time-of-day synchronized flag to be described later indicating whether a time-of-day synchronization has been performed within a certain period of time. The authentication processor 304 determines the necessity of the time-of-day synchronization process using NTP by checking the ON/OFF of an NTP setting in the MFP 101 and checking if the setting for an IP address of the time-of-day synchronization server 104 has been done or not. When determining that the time-of-day synchronization process needs to be performed, and that performing the time-of-day synchronization process is possible (YES in S404), the authentication processor 304 advances the process to S405. Otherwise (NO in S404), the authentication processor 304 advances the process to S408.

In S405, the authentication processor 304 instructs the time-of-day synchronization processor 303 to perform the time-of-day synchronization process. The time-of-day synchronization processor 303 performs the time-of-day synchronization process using NTP for the time-of-day synchronization server 104.

In S406, the authentication processor 304 determines whether the time-of-day synchronization has succeeded. When determining that the time-of-day synchronization has succeeded (YES in S406), the authentication processor 304 advances the process to S407, and when determining that the time-of-day synchronization has failed (NO in S406), the authentication processor 304 advances the process to S408.

In S407, the time-of-day synchronization processor 303 sets the time-of-day synchronized flag managed by time-of-day synchronization processor 303 and notifies the authentication processor 304 of the result of the time-of-day synchronization.

The time-of-day synchronized flag indicates whether the time-of-day synchronization has been performed within the certain period of time. If the time-of-day synchronization has not been performed for a period of time exceeding a set threshold value, the time-of-day synchronization processor 303 initializes this flag to unsynchronized.

In S408, the authentication processor 304 gives an instruction for the Kerberos authentication to the data transmission processor 306. The data transmission processor 306 performs the Kerberos authentication to the integrated authentication management server 103 such as a KDC, via the transmitter/receiver 305. The data transmission processor 306 notifies the authentication processor 304 of the authentication result of the Kerberos authentication, via the transmitter/receiver 305.

In S409, the authentication processor 304 determines whether the Kerberos authentication has succeeded. When determining that the Kerberos authentication has succeeded (YES in S409), the authentication processor 304 advances the process to S417, and when determining that the Kerberos authentication has failed (NO in S409), the authentication processor 304 advances the process to S410.

In S417, the data transmission processor 306 acquires a ticket for accessing the server 102, from the integrated authentication management server 103 via the transmitter/receiver 305, and notifies the authentication processor 304 of the ticket. The authentication processor 304 notifies the scan processor 302 of an authentication result. The scan processor 302 displays the authentication result for the operator of the MFP 101, via the UI processor 301, to notify the operator that the login to the server 102 has been performed, and then terminates the process of the flowchart illustrated in FIG. 4. The process allows a process of transferring scan data from the MFP 101 to the server 102 to be performed later.

When the Kerberos authentication has failed, the failure of the authentication may be due to a difference in time of day between the MFP 101 and the integrated authentication management server 103. To check for the difference, in S410, the authentication processor 304 determines whether the time of day has been synchronized. When determining that the time of day has been synchronized (YES in S410), the authentication processor 304 advances the process to S418, and when determining that the time of day has not been synchronized (NO in S410), the authentication processor 304 advances the process to S411. The process of S410 is an example of a process of determining whether the time-of-day synchronization process has been performed within a set period of time.

When the time of day has not been synchronized, re-authentication under another authentication method that does not perform the time-of-day synchronization (does not check for the time synchronization in detail) may lead to an authentication success. In the present embodiment, the NTLM authentication is included in the user authentication methods available in the MFP 101. The authentication processor 304 thus attempts to perform the NTLM authentication. In general, PCs and MFPs have settings such as security policy to enhance the security strengths of authentication and encryption. In a case where security policy settings are introduced in the MFP 101 in the present embodiment, the NTLM authentication can be set to not be performed.

In S411, the authentication processor 304 acquires the security policy settings of the MFP 101 and determines whether or not to perform the NTLM authentication. The authentication processor 304 determines whether the NTLM authentication is made disabled in the security policy. When determining that the NTLM authentication is made unavailable (YES in S411), the authentication processor 304 advances the process to S412, and when determining that the NTLM authentication is made available (NO in S411), the authentication processor 304 advances the process to S418.

In S412, the authentication processor 304 makes an order for the NTLM authentication to the data transmission processor 306. The data transmission processor 306 performs the NTLM authentication to the server 102, via the transmitter/receiver 305. The data transmission processor 306 notifies the authentication processor 304 of an authentication result received from the server 102 via the transmitter/receiver 305.

In S413, the authentication processor 304 determines whether the NTLM authentication has succeeded, based on the authentication result. When determining that the NTLM authentication has succeeded (YES in S413), the authentication processor 304 advances the process to S414, and when determining that the NTLM authentication has failed (NO in S413), the authentication processor 304 advances the process to S418.

In S414, the authentication processor 304 determines whether the time of day has been synchronized. When determining that the time of day has been synchronized (YES in S414), the authentication processor 304 advances the process to S415, and when determining that the time of day has not been synchronized (NO in S414), the authentication processor 304 advances the process to S417.

In S415, based on the result that the Kerberos authentication has failed, and the NTLM authentication has succeeded, the authentication processor 304 notifies the scan processor 302 of the possibility of a difference in time of day between the integrated authentication management server 103 and the MFP 101, together with the result of the NTLM authentication. The scan processor 302 displays a message warning of the difference in time of day between the integrated authentication management server 103 and the MFP 101, for the operator of the MFP 101, via the UI processor 301. An example of the warning message is illustrated in FIG. 5 to be described later.

In S416, the authentication processor 304 determines whether the NTLM authentication is contained in the authenticatable method list as the next priority of the user authentication. When the NTLM authentication is contained in the authenticatable method list as the next priority of the user authentication (YES in S416), the authentication processor 304 advances the process to S411. When the NTLM authentication is not contained in the authenticatable method list (NO in S416), the authentication processor 304 advances the process to S418.

In S418, the authentication processor 304 notifies the scan processor 302 of an authentication result. The scan processor 302 displays the authentication result for the operator of the MFP 101, via the UI processor 301, to notify the operator that the login to the server 102 has failed. The scan processor 302 then terminates the process of the flowchart illustrated in FIG. 4.

Figure 5:
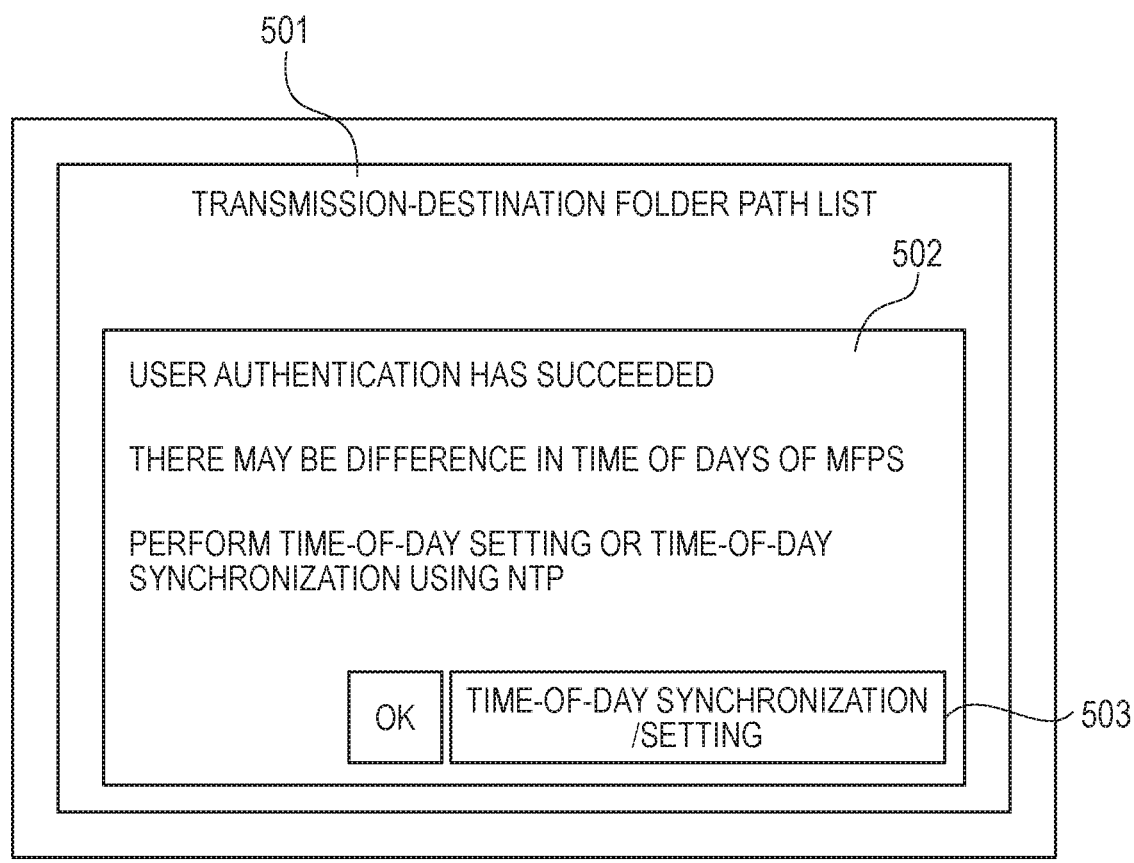
FIG. 5 is a diagram illustrating an example of a warning message.

FIG. 5 is a diagram illustrating an example of a message displayed on the operation unit 206 in S415 and warning the operator of the MFP 101 about a difference in time of day between the integrated authentication management server 103 and the MFP 101.

A screen 501 is a screen to be displayed when the user authentication has succeeded, displaying a folder list in a shared folder of the server 102. What is displayed on the operation unit 206 is a list of information folder paths acquired by the data transmission processor 306 from the server 102 through a browsing process.

A message 502 is a message warning that a difference in time of day occurred in S415 between the integrated authentication management server 103 and the MFP 101.

Based on the result that the Kerberos authentication has failed, and the NTLM authentication has succeeded, the authentication processor 304 notifies the scan processor 302 of the possibility of the difference in time of day. The scan processor 302 displays the possibility via the UI processor 301.

A button 503 is a time-of-day setting/synchronization button. The button 503 is an example of an object for displaying a screen for the time-of-day synchronization or the time-of-day setting.

Displaying the message 502 on the operation unit 206 has a purpose of urging the operator of the MFP 101 to immediately make instructions to set or synchronize the time of day.

Figure 6:
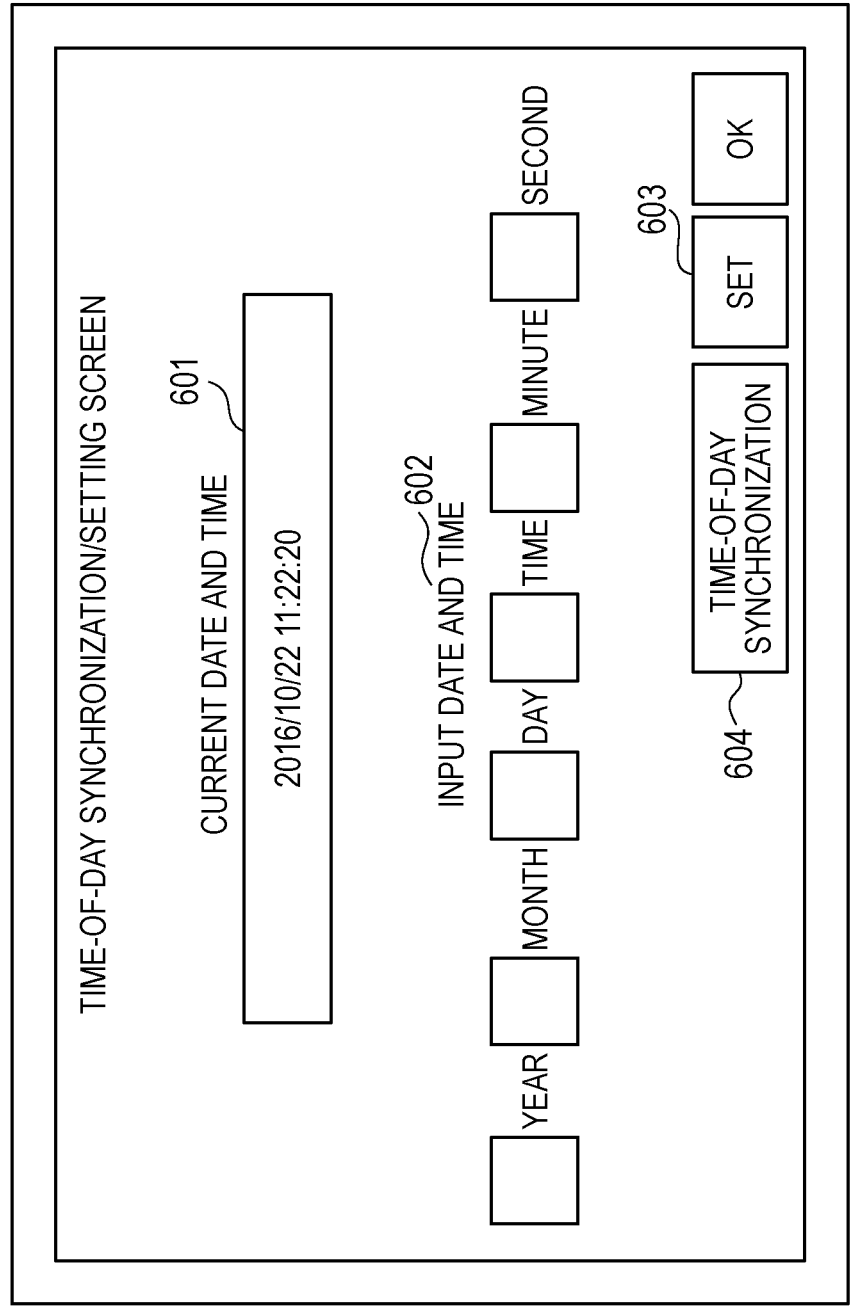
FIG. 6 is a diagram illustrating an example of a screen for making instructions to set or synchronize a time of day.

FIG. 6 is a diagram illustrating an example of a screen displayed on the operation unit 206 by selecting the button 503, for making instructions to set or synchronize the time of day.

A time of day 601 means a current date and time managed by the MFP 101. More specifically, the time of day 601 is managed by the RTC 210.

An input form 602 is a date-and-time input form necessary in a case where the operator of the MFP 101 manually sets the date and time using the operation unit 206.

A button 603 is a button used after the manual input in the input form 602 and selected for making the MFP 101 reflect the input date and time. By selecting the button 603, the UI processor 301 sets the date and time input via the input form 602, to the RTC 210 and changes the display of the current date and time of the time of day 601 to the date and time input via the input form 602.

When the date and time of the MFP 101 is manually input, the time-of-day synchronization processor 303 is supposed not to set the time-of-day synchronized flag because of the possibility of an erroneous input or the like.

A button 604 is a button for performing the time-of-day synchronization using NTP. By selecting the button 604, the UI processor 301 instructs the time-of-day synchronization processor 303 to perform the time-of-day synchronization process. The time-of-day synchronization processor 303 performs the time-of-day synchronization process with the time-of-day synchronization server 104. The time-of-day synchronization process is completed when the time-of-day synchronization processor 303 makes the RTC 210 reflect a time of day returned from the time-of-day synchronization server 104 and sets the time-of-day synchronized flag.

The above configuration allows for warning the operator of the MFP about the failure of the authentication due not to an erroneous input of user authentication information but to a difference in time of day, and for mitigating the degradation in the convenience of the user authentication in the MFP.

Other Embodiments

The present invention supplies a system or an apparatus with a program implementing at least one of the functions of the embodiment described above, over a network or via a storage medium. The at least one of the functions can be also implemented by processing in which at least one processor in a computer of the system or the apparatus reading and executing the program. The at least one of the functions can be also implemented by a circuit (e.g., ASIC) implementing the at least one of the functions.

An example of an embodiment of the present invention has been described above in detail, but the present invention is not limited to such a specified embodiment.

A part or the whole of the software configuration of the MFP 101 described above may be implemented in the MFP 101 in the form of a hardware configuration.

The hardware configuration of the MFP 101 does not necessarily have to include only one CPU, one RAM, one non-volatile memory, and one NIC. A plurality of CPUs may perform the process based on the program, and using data and the like stored in a plurality of RAMs, ROMs (read only memories), and HDDs (hard disk drives), to implement the functions of the MFP 101.

Alternatively, in place of the CPU, a GPU (graphics processing unit) may be used.

As seen from the above, according to the processes of the embodiments described above, the convenience of the MFP 101 being a device on the file transfer side can be improved.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
a memory device that stores a set of instructions; and
at least one processor that executes the set of instructions to:
perform a process of time-of-day synchronization with a time-of-day synchronization server and reset time-of-day setting; and
perform authentication by a first authentication method or a second authentication method with stored user authentication information,
wherein the at least one processor performs the authentication by the first authentication method,
in a case where the authentication by the first authentication method succeeds, the at least one processor performs a process to be performed when the authentication succeeds without performing the authentication by the second authentication method,
in a case where the authentication by the first authentication method fails and the resetting of time-of-day setting by the process of time-of-day synchronization succeeds, the at least one processor notifies a failure of the authentication without performing the authentication by the second authentication method,
in a case where the authentication by the first authentication method fails and the resetting of time-of-day setting by the process of time-of-day synchronization fails, the at least one processor performs the authentication by the second authentication method,
in a case where the authentication by the second authentication method fails, the at least one processor notifies a failure of the authentication, and
in a case where the authentication by the second authentication method succeeds, the at least one processor notifies that there is a certain difference or more between a time of day of the information processing apparatus and a time of day of the time-of-day synchronization server.

2. The information processing apparatus according to claim 1, wherein the at least one processor executes the set of instructions in the memory device to:
perform the authentication with an authenticating server by the first authentication method, and
perform the authentication with a server being a data transmission destination by the second authentication method in the case where the authentication by the first authentication method fails and the process of time-of-day synchronization is not performed within a set period of time.

3. The information processing apparatus according to claim 2, wherein the authentication server is a server configured to manage user authentication information for logging in to the server being the data transmission destination.

4. The information processing apparatus according to claim 2, wherein the at least one processor executes the set of instructions in the memory device to:
receive a list of authentication methods from the server being the data transmission destination, and
perform the authentication with the authentication server by the first authentication method in a case where the authentication by the first authentication method is determined to be available based on the list of the authentication methods.

5. The information processing apparatus according to claim 4, wherein the at least one processor executes the set of instructions in the memory device to perform the authentication with the server being the data transmission destination by the second authentication method in a case where the authentication by the first authentication method is determined to be unavailable and the authentication by the second authentication method is determined to be available, based on the list of the authentication methods.

6. The information processing apparatus according to claim 1, wherein the at least one processor executes the set of instructions in the memory device to display a screen including a message indicating a difference from a time of day of the time-of-day synchronization server in a case where the authentication by the second authentication method succeeds and the process of time-of-day synchronization is performed within a set period of time.

7. The information processing apparatus according to claim 6, wherein the screen includes an object for displaying a screen for time-of-day synchronization or time-of-day setting.

8. The information processing apparatus according to claim 7, wherein the at least one processor executes the set of instructions in the memory device to display the screen for the time-of-day synchronization or the time-of-day setting in a case where the object is selected.

9. The information processing apparatus according to claim 1, wherein the authentication by the first authentication method is Kerberos authentication, and the authentication by the second authentication method is Windows NT LAN Manager (NTLM) authentication.

10. The information processing apparatus according to claim 1, wherein the information processing apparatus is an image processing apparatus.

11. An information processing method performed by an information processing apparatus, the information processing method comprising:

performing a process of time-of-day synchronization with a time-of-day synchronization server and resetting time-of-day setting;

performing authentication by a first authentication method or a second authentication method with stored user authentication information; and performing the authentication by the first authentication method, wherein in a case where the authentication by the first authentication method succeeds, a process to be performed when the authentication succeeds is performed without performing the authentication by the second authentication method, in a case where the authentication by the first authentication method fails and the resetting of time-of-day setting by the process of time-of-day synchronization succeeds, a failure of the authentication is notified without performing the authentication by the second authentication method, in a case where the authentication by the first authentication method fails and the resetting of time-of-day setting by the process of time-of-day synchronization fails, the authentication by the second authentication method is performed, in a case where the authentication by the second authentication method fails, a failure of the authentication is notified, and in case where the authentication by the second authentication method succeeds, it is notified that there is a certain difference or more between a time of day of the information processing apparatus and a time of day of the time-of-day synchronization server.

12. A non-transitory computer-readable recording medium recording instructions of a program to cause a computer to:

perform a process of time-of-day synchronization with a time-of-day synchronization server and reset time-of-day setting;

perform authentication by a first authentication method or a second authentication method with stored user authentication information; and perform the authentication by the first authentication method, wherein in a case where the authentication by the first authentication method succeeds, a process to be performed when the authentication succeeds is performed without performing the authentication by the second authentication method, in a case where the authentication by the first authentication method fails and the resetting of time-of-day setting by the process of time-of-day synchronization succeeds, a failure of the authentication is notified without performing the authentication by the second authentication method, in a case where the authentication by the first authentication method fails and the resetting of time-of-day setting by the process of time-of-day synchronization fails, the authentication by the second authentication method is performed, in a case where the authentication by the second authentication method fails, a failure of the authentication is notified, and in a case where the authentication by the second authentication method succeeds, it is notified that there is a certain difference or more between a time of day of the information processing apparatus and a time of day of the time-of-day synchronization server.

* * * * *